(12) United States Patent
Nakao

(10) Patent No.: US 7,698,956 B2
(45) Date of Patent: Apr. 20, 2010

(54) CORIOLIS FLOW METER WITH VIBRATING DIRECTION RESTRICTION MEANS

(75) Inventor: Yuichi Nakao, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 12/085,359

(22) PCT Filed: Feb. 26, 2007

(86) PCT No.: PCT/JP2007/054113

§ 371 (c)(1),
(2), (4) Date: May 22, 2008

(87) PCT Pub. No.: WO2007/105507

PCT Pub. Date: Sep. 20, 2007

(65) Prior Publication Data

US 2009/0038411 A1    Feb. 12, 2009

(30) Foreign Application Priority Data

Mar. 14, 2006   (JP) .............................. 2006-069282

(51) Int. Cl.
    *G01F 1/84*   (2006.01)
(52) U.S. Cl. ..................... 73/861.357; 73/861.355; 73/861.356
(58) Field of Classification Search ................................ 73/861.354–861.357
    See application file for complete search history.

(56) References Cited

U.S. PATENT DOCUMENTS

| | | | |
|---|---|---|---|
| 4,491,025 A * | 1/1985 | Smith et al. ............ | 73/861.355 |
| 4,730,501 A * | 3/1988 | Levien .................. | 73/861.357 |
| 4,811,606 A * | 3/1989 | Hasegawa et al. ...... | 73/861.357 |
| 4,831,885 A * | 5/1989 | Dahlin .................. | 73/861.355 |
| 4,891,991 A * | 1/1990 | Mattar et al. ........... | 73/861.357 |
| 4,895,030 A * | 1/1990 | Bergamini et al. ..... | 73/861.355 |
| 4,911,006 A * | 3/1990 | Hargarten et al. ...... | 73/861.356 |
| 4,911,020 A * | 3/1990 | Thompson ............. | 73/861.356 |
| 4,934,195 A * | 6/1990 | Hussain ................. | 73/861.355 |
| 4,938,075 A * | 7/1990 | Lew ...................... | 73/861.355 |
| 5,009,109 A * | 4/1991 | Kalotay et al. ......... | 73/861.356 |
| 5,054,326 A * | 10/1991 | Mattar .................. | 73/861.355 |
| 5,090,253 A * | 2/1992 | Kolpak ................. | 73/861.355 |

(Continued)

FOREIGN PATENT DOCUMENTS

JP     62147320 A  *  7/1987

(Continued)

OTHER PUBLICATIONS

International Search Report mailed Apr. 17, 2007 for International Application No. PCT/JP2007/054113.

*Primary Examiner*—Lisa M Caputo
*Assistant Examiner*—Jonathan Dunlap
(74) *Attorney, Agent, or Firm*—Wenderoth, Lind & Ponack, L.L.P.

(57) ABSTRACT

A Coriolis flow meter (11) with a vibrating direction restriction means includes flow tubes (13, 13), a drive means (14) for driving the flow tubes (13, 13), and phase difference detection means (15, 15) for detecting a phase difference in proportion to a Coriolis force. The Coriolis flow meter further includes plate springs (16, 16) functioning as vibrating direction restriction means, and a flow tube fixing member (17) also functioning as a vibrating direction restriction means and serving to fix the flow tubes (13, 13) in position.

10 Claims, 8 Drawing Sheets

U.S. PATENT DOCUMENTS

| | | | | |
|---|---|---|---|---|
| 5,123,287 A * | 6/1992 | Lew | ....................... | 73/861.355 |
| 5,230,254 A * | 7/1993 | Craft | ..................... | 73/861.355 |
| 5,241,865 A * | 9/1993 | Lew | ....................... | 73/861.355 |
| 5,271,281 A * | 12/1993 | Mattar et al. | ........... | 73/861.355 |
| 5,343,764 A * | 9/1994 | Mattar et al. | ........... | 73/861.355 |
| 5,355,737 A * | 10/1994 | Lew et al. | ............... | 73/861.355 |
| 5,359,901 A * | 11/1994 | Lew et al. | ............... | 73/861.356 |
| 5,394,758 A * | 3/1995 | Wenger et al. | ......... | 73/861.355 |
| 5,425,277 A * | 6/1995 | Lew | ....................... | 73/861.355 |
| 5,485,755 A * | 1/1996 | Lew | ....................... | 73/861.356 |
| 5,501,106 A * | 3/1996 | Lew et al. | ............... | 73/861.356 |
| 5,540,106 A * | 7/1996 | Lew et al. | ............... | 73/861.356 |
| 5,546,814 A * | 8/1996 | Mattar et al. | ........... | 73/861.355 |
| 5,731,527 A * | 3/1998 | Van Cleve | ............. | 73/861.355 |
| 5,926,096 A * | 7/1999 | Mattar et al. | ........... | 73/861.356 |
| 6,272,438 B1 * | 8/2001 | Cunningham et al. | .. | 73/861.355 |
| 6,308,580 B1 * | 10/2001 | Crisfield et al. | ........ | 73/861.355 |
| 6,415,668 B1 * | 7/2002 | Cage | ..................... | 73/861.355 |
| 6,450,042 B1 * | 9/2002 | Lanham et al. | ........ | 73/861.357 |
| 6,776,052 B2 * | 8/2004 | Crisfield et al. | ........ | 73/861.354 |
| 6,776,053 B2 * | 8/2004 | Schlosser et al. | ....... | 73/861.355 |
| 6,895,826 B1 * | 5/2005 | Nakao et al. | ........... | 73/861.355 |
| 2003/0097881 A1 * | 5/2003 | Schlosser et al. | ....... | 73/861.355 |

FOREIGN PATENT DOCUMENTS

| | | |
|---|---|---|
| JP | 02042319 A * | 2/1990 |
| JP | 3-31725 | 2/1991 |
| JP | 4-55250 | 2/1992 |
| JP | 5-69453 | 3/1993 |
| JP | 5-54891 | 8/1993 |
| JP | 7-18734 | 3/1995 |
| JP | 2622227 | 4/1997 |
| JP | 2939242 | 6/1999 |
| JP | 2005-221380 | 8/2005 |
| WO | 85/05677 | 12/1985 |

* cited by examiner (a)

(b)

(a)  (b)  (c)  (d)

(a)

(b)

(c)

(d)

Prior Art

CORIOLIS FLOW METER WITH VIBRATING DIRECTION RESTRICTION MEANS

BACKGROUND OF THE INVENTION

1. Technical Field

The present invention relates to a Coriolis flow meter which detects a phase difference and/or a vibration frequency proportional to a Coriolis force applied to a curved flow tube to thereby obtain a mass flow rate and/or the density of a fluid flowing through the flow tube, and in particular a Coriolis flow meter which is suitable for minute flow rate measurement.

2. Background Art

The Coriolis flowmeter is a mass flowmeter which utilizes the fact that when a flow tube through which a fluid flows is supported at one end or both ends thereof, and vibration is applied to a portion of the flow tube around the supporting point of the flow tube in a direction perpendicular to the flow direction, the Coriolis forces applied to the flow tube are proportional to the mass flow rate. Coriolis flowmeters, which are well known, are roughly classified in two types according to flow tube structure: a straight-tube type, and a curved-tube type.

In a Coriolis flowmeter of the straight-tube type, when vibration is applied to a straight tube, of which both ends are supported, in a direction vertical to the straight-tube center portion axis, a difference in displacement due to the Coriolis forces is generated between the support portions and the central portion of the straight tube, that is, a phase difference signal is obtained. Based on this phase difference signal, the mass flow rate is detected. The straight tube type Coriolis flowmeter thus constructed has a simple, compact, and solid structure. On the other hand, there arises a problem in that it is difficult to achieve high detection sensitivity.

In contrast, the curved tube type Coriolis flowmeter is superior to the straight tube type Coriolis flowmeter from a view point that the curved tube type Coriolis flowmeter allows selection of a shape for effectively obtaining the Coriolis forces. In fact, the curved tube type Coriolis flowmeter is capable of performing mass flow rate detection with high sensitivity. Known examples of the curved tube type Coriolis flowmeter include one equipped with a single flow tube (see, for example, JP 04-55250 A), one equipped with two flow tubes arranged in parallel (see, for example, JP 2939242 B), and one equipped with a single flow tube in a looped state (see, for example, JP 05-69453 A).

BRIEF SUMMARY OF THE INVENTION

In order to measure an ultra-minute flow rate in a curved tube type Coriolis flow meter, a high sensitivity tube structure is needed. From the viewpoint of securing vibration resistance, a flow tube is not usually driven to vibrate at a frequency of more than 50 to 60 Hz, so, in order to secure a phase difference under this restriction, a tube structure which exhibits low rigidity with respect to the mode in which the Coriolis force is received is required in order to realize high sensitivity. A tube structure of low rigidity may be realized by bending a flow tube into a triangular configuration, an elliptical configuration or the like; however, in order to achieve a further improvement in terms of sensitivity, it is advisable to bend a flow tube into an elliptical configuration having a sufficient lateral length as shown in FIG. 8.

However, in the configuration of FIG. 8, the frequency of a vibration (in-phase or antiphase) in the Z-axis direction becomes equal to or lower than the drive frequency of the flow tube, and there is a possibility of a vibration in the Z-axis direction being generated through driving by the drive means. When a vibration in the Z-axis direction is generated, a vibration will be generated in a direction in which no driving ought to be performed, resulting in deterioration in terms of instrumental error and in an increase in vibration leakage, which will lead to instability in the zero-point.

The present invention has been made in view of the above-mentioned problem, and has an object to provide a high sensitivity Coriolis flow meter which is well suited for measurement of ultra-minute flow rates.

A Coriolis flow meter according to a first embodiment of the present invention, which has been made to solve the above-mentioned problem, is a Coriolis flow meter with a vibrating direction restriction means adapted to drive at least one flow tube and detect a phase difference and/or a vibration frequency in proportion to a Coriolis force applied to the flow tube, and to thereby obtain a mass flow rate and/or a density of a fluid flowing through the flow tube. The Coriolis flow meter with a vibrating direction restriction means has such a feature that, assuming that a direction in which the flow tube vibrates is indicated by an X-axis, that a tube axis direction at a vibration antinode position of the flow tube is indicated by a Y-axis, and that a direction orthogonal to the X-axis and the Y-axis is indicated by a Z-axis, there is provided an elastic member exhibiting lower rigidity in the X-axis direction than that in the Y-axis direction and the Z-axis direction, one end of the elastic member being fixed to the vibration antinode position of the flow tube or to a portion in the vicinity thereof, another end of the elastic member being fixed to a rigid body whose rigidity is higher than that of the flow tube.

According to the first embodiment of the present invention having the above-mentioned features, the elastic member fixed to the rigid body is connected to the flow tube. Due to the presence of the elastic member, the flow tube can be supported at a position other than the tube's fixed ends. When driven by the drive means, the flow tube vibrates while restricted in vibration in a direction other than the driving direction being restricted due to the rigidity characteristics of the elastic member. In the present invention, the rigid body and the elastic member fixed to the rigid body correspond to the vibrating direction restriction means. Due to the provision of the vibrating direction restriction means and the adoption of a tube structure of low rigidity, it is possible to provide a high sensitivity Coriolis flow meter which is suitable for measurement of ultra-minute flow rates.

A Coriolis flow meter with a vibrating direction restriction means according to a second embodiment of the present invention is the Coriolis flow meter with a vibrating direction restriction means according to the first embodiment of the present invention wherein the flow tube is formed in a substantially elliptical configuration elongated in the Y-axis direction. A Coriolis flow meter with a vibrating direction restriction means according to a third embodiment of the present invention is the Coriolis flow meter with a vibrating direction restriction means according to the first or second embodiments of the present invention wherein the flow tube is a thin tube with a small wall thickness.

According to the second and third embodiments of the present invention having the above-mentioned features, it is possible to obtain a tube structure of high sensitivity.

According to the present invention, it is possible to prevent generation of vibration in a direction in which no driving ought to be performed, thereby preventing deterioration in instrumental error and achieving stabilization of the zero-point. Thus, it is possible to provide a high sensitivity Coriolis flow meter which is suitable for measurement of ultra-minute flow rates.

DETAILED DESCRIPTION OF THE INVENTION

Figure 1:
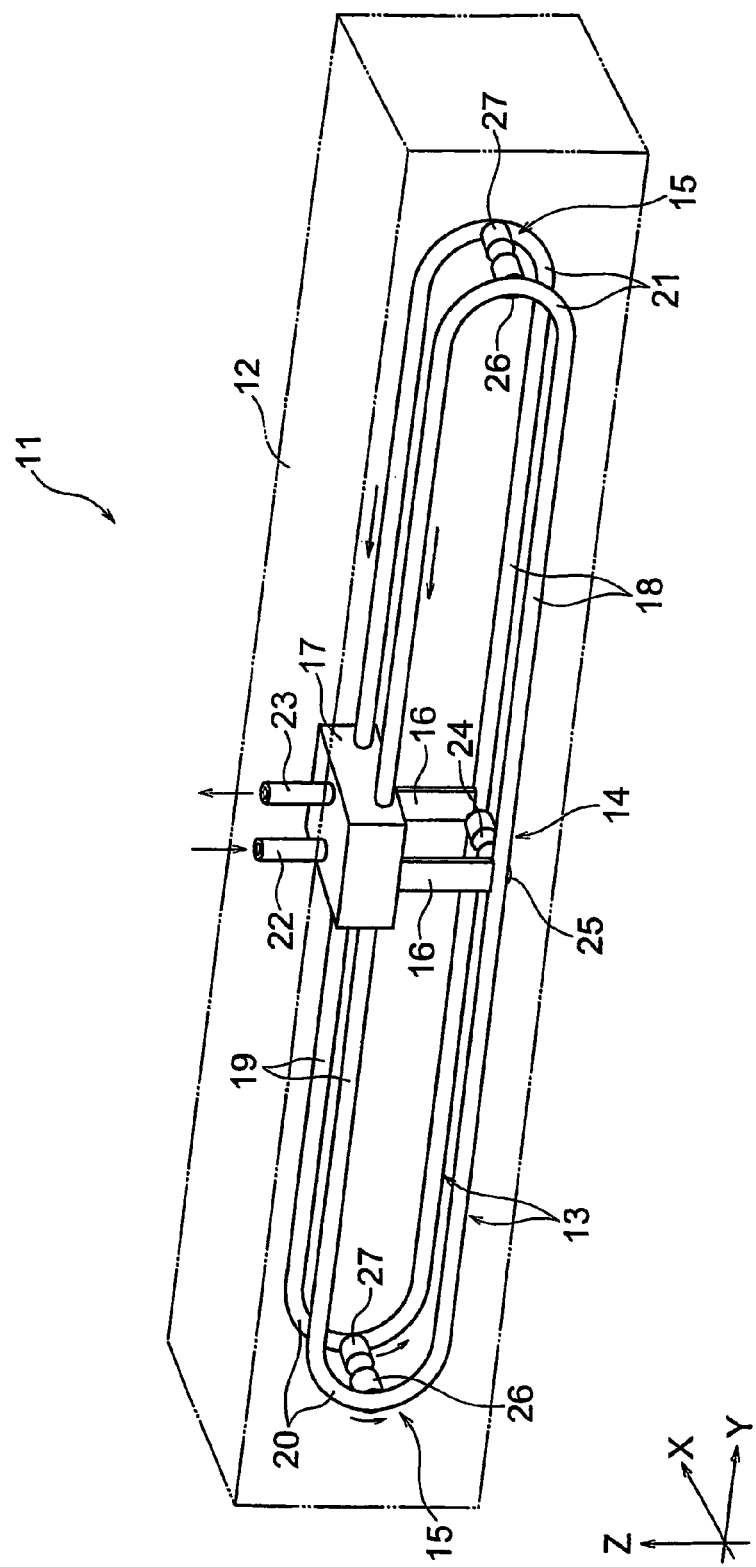
FIG. 1 is a perspective view of a Coriolis flow meter with a vibrating direction restriction means according to an embodiment of the present invention.
Figure 2:
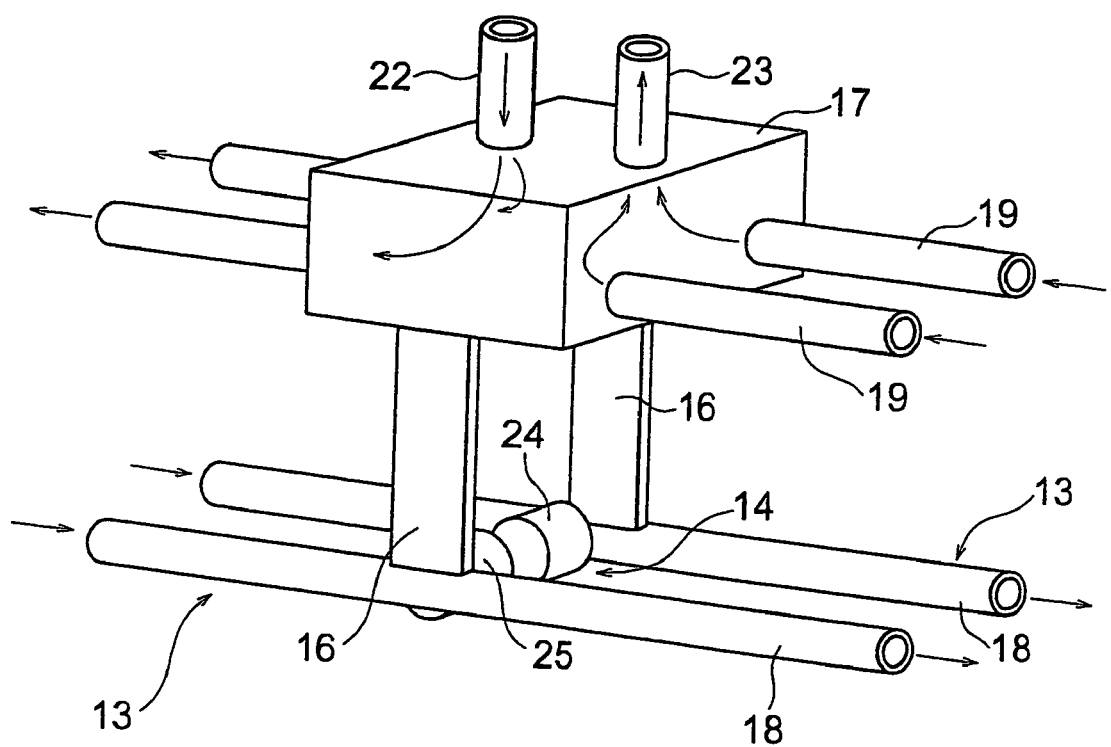
FIG. 2 is an enlarged view of a main portion of FIG. 1.

In the following, the present invention will be described with reference to the drawings. FIG. 1 is a perspective view of a Coriolis flow meter with a vibrating direction restriction means according to an embodiment of the present invention. FIG. 2 is an enlarged view of a main portion of FIG. 1.

In FIG. 1, a Coriolis flow meter 11 with a vibrating direction restriction means according to the present invention (hereinafter simply referred to as Coriolis flow meter 11) is equipped with a casing 12, flow tubes 13, 13 accommodated in the casing 12, a drive portion or means 14 for driving the flow tubes 13, 13, a phase difference detection portion or means 15, 15 for detecting a phase difference in proportion to the Coriolis force, a temperature sensor (not shown), a signal computation processing portion (not shown) for performing computation processing on mass flow rate, etc., and an excitation circuit portion (not shown) for exciting the drive means 14.

Further, the Coriolis flow meter 11 of the present invention is equipped with plate springs 16, 16 functioning as vibrating direction restriction portions or means, and a flow tube fixing member 17 also functioning as a vibrating direction restriction portion or means and serving to fix the flow tubes 13, 13 in position.

In the following, the components will be described with reference to FIGS. 1 and 2. (In the description, the driving direction of drive means 14 (which corresponds to vibrating direction of flow tubes 13, 13) is indicated by the X-axis, the tube axis direction at the antinode position of the vibration of flow tubes 13, 13 (corresponding to the driven position in the drawing) is indicated by the Y-axis, and the direction orthogonal to the X-axis and the Y-axis is indicated by the Z-axis. The directions are as indicated in the drawing.)

The casing 12 has a structure resistant to bending and torsion. The casing 12 is large enough to be capable of accommodating the flow tubes 13, 13 when fixed to the flow tube fixing member 17. Further, the casing 12 is capable of protecting the flow meter main body including the flow tubes 13, 13, etc., from the outside. The interior of the casing 12 is filled with an inert gas such as argon gas. Due to the filling with the inert gas, condensation on the flow tubes 13, 13, etc. is prevented.

The flow tubes 13, 13 are formed of a material usually adopted in this technical field, such as stainless steel, hastelloy, titanium alloy, or metallic glass. In this embodiment, the flow tubes 13, 13 are formed as thin tubes with a small wall thickness, which are substantially of an elliptical configuration elongated in the Y-axis direction. (Its width as measured in the Y-axis direction is sufficiently larger than its height as measured in the Z-axis direction. Although there are no particular restrictions in this regard, in this embodiment, the ratio of the length in the Y-axis direction (width) to the length in the Z-axis direction (height) is 8.5:1.) The flow tubes 13, 13 are arranged at a predetermined interval. End portions of the flow tubes 13, 13 are fixed to the flow tube fixing member 17.

Here, the different portions of the flow tubes 13, 13 of this embodiment will be described. The flow tubes 13, 13 have driving side straight tube portions 18, 18 whose tube axes extend straight in the Y-axis direction, stationary side straight tube portions 19, 19 parallel to the driving side straight tube portions 18, 18 and fixed to the flow tube fixing member 17, and inflow side curved tube portions 20, 20 and outflow side curved tube portions 21, 21 of a semi-circular configuration connecting the driving side straight tube portions 18, 18 and the stationary side straight tube portions 19, 19 to each other. Inside the flow tube fixing member 17, the fixed end portions of the flow tubes 13, 13 communicate with an inflow side manifold 22 and an outflow side manifold 23. The arrows in the drawing indicate the flowing direction of the fluid.

The configuration of the flow tubes 13, 13 as shown in the drawing is only given by way of example, and there are no particular limitations in this regard as long as it provides a tube structure of a low rigidity. (For example, it is also possible to adopt the configuration as disclosed in JP 2005-221251 A, which is formed by bending a single tube.) Further, it is also possible to use the opposing portions of the flow tubes within the flow tube fixing member 17 as an upstream measurement tube portion and a downstream measurement tube portion, and to provide an inner flow path connecting the start end and the terminal end of those tubes, thus forming a so-called dual loop type structure, which is equivalent to a structure in which a single flow tube is looped.

The drive means 14 causes mainly the driving side straight tube portions 18, 18 of the flow tubes 13, 13 to vibrate while opposing them to each other, and is equipped with a coil 24 and a magnet 25. The drive means 14 is arranged at the center of the driving side straight tube portions 18, 18 and so as to be held therebetween. The drive means 14 is mounted at a position where it minimizes offset as much as possible with respect to the vibrating direction (driving direction) of the flow tubes 13, 13.

When an attracting action is generated in the drive means 14, the magnet 25 is inserted into the coil 24, with the result that the driving side straight tube portions 18, 18 of the flow tubes 13, 13 are brought close to each other. In contrast, when a repulsive action is generated, the driving side straight tube portions 18, 18 are moved away from each other. Since the flow tubes 13, 13 are fixed with respect to the flow tube fixing member 17 as described above, the drive means 14 alternately drives the flow tubes 13, 13 in the rotating direction around the flow tube fixing member 17.

The phase difference detection means 15, 15 are sensors for detecting vibration of the flow tubes 13, 13 and for detecting a phase difference proportional to the Coriolis forces acting on the flow tubes 13, 13, and are each equipped with a coil 26 and a magnet 27. (The sensors are not restricted to the ones as described above; they may also be acceleration sensors, optical sensors, or capacitance-type or distortion-type (piezoelectric-type) sensors as long as they are capable of detecting one of displacement, velocity, and acceleration.) The phase difference detection means 15, 15 thus constructed are arranged, for example, at positions within a range where the sensors are held between the inflow side curved tube portions 20, 20 and the outflow side tube portions 21, 21 of the flow tubes 13, 13 and where they can detect the phase difference, which is proportional to the Coriolis force.

The above-mentioned temperature sensor (not shown) is provided for the purpose of temperature compensation of the Coriolis flow meter 11. It is fixed to a portion in the vicinity of the fixed end portion of one flow tube 13 by an appropriate means. The wiring from the temperature sensor (not shown), the coils 26 of the phase difference detectors 15, and the coil 24 of the drive means 14 are connected to a board (not shown) accommodated in the casing 12. A wire harness (not shown) is connected to this board. The wire harness leads out of the casing 12.

Wiring and connection is effected on the above-mentioned signal computation processing portion (not shown) such that a detection signal from the phase difference detectors 15, 15 related to deformation of the flow tubes 13, 13, and a detection signal from the temperature sensor related to the temperature of each of the flow tubes 13, 13 are input thereto. In the signal computation processing portion, the mass flow rate and the density are computed based on the detection signals thus input. In the signal computation processing portion, the mass flow rate and the density obtained through computation are output to a display device (not shown).

Figure 3:
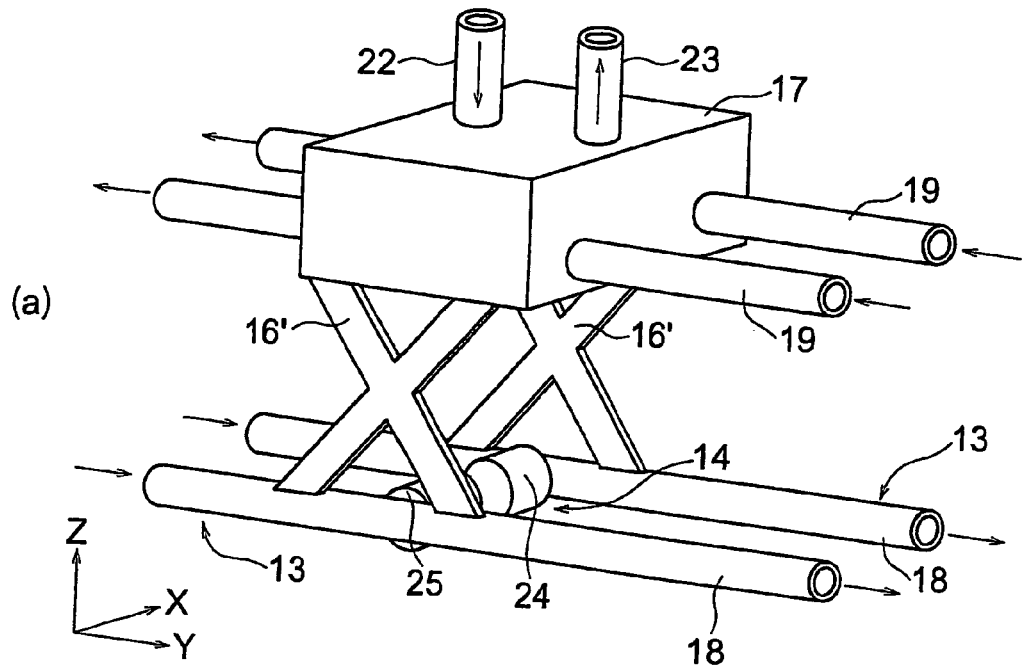
FIG. 3 are perspective views each showing another example of plate springs.
Figure 3:
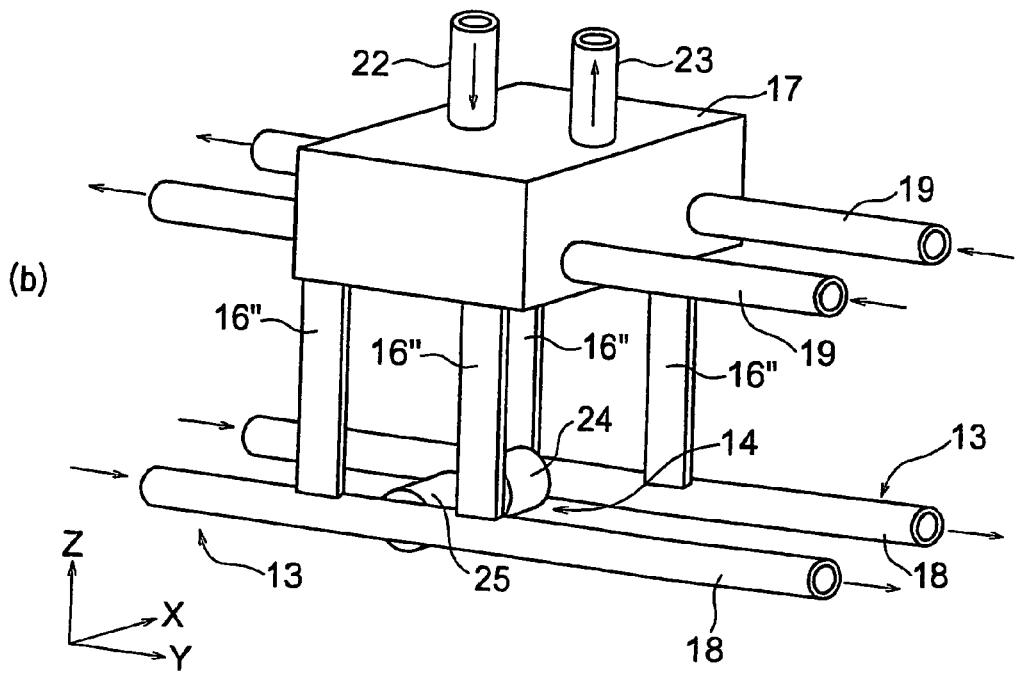

The plate springs 16, 16 are elastic members functioning as vibrating direction restriction means, and are formed, for example, in a strip-like configuration as shown in the drawing. (Apart from this, it is also possible to adopt, for example, the configurations as shown in FIG. 3 indicated by reference numerals 16' and 16". There are no particular limitations regarding their configuration as long as they can provide the rigidity characteristics as described below.) The plate springs 16, 16 are formed so as to exhibit lower rigidity in the X-axis direction than in the Y-axis direction and the Z-axis direction.

The plate springs 16, 16 are formed of a material suitable for plate springs including stainless steel, or the like. One end of each of the plate springs 16, 16 is fixed to the center of each of the driving side straight tube portions 18, 18 of the flow tubes 13, 13. (It is fixed to the side opposite to drive means 14. It is a driven position; it may also be fixed to a portion in the vicinity thereof.) The other ends of the plate springs 16, 16 are fixed to the flow tube fixing member 17. The fixing of the plate springs 16, 16 can be effected by, for example, brazing. It is also possible to use a dedicated small bracket, or machine their end portions so as to facilitate the fixing.

The plate springs 16, 16 also support the flow tubes 13, 13 at positions other than the fixed end portions of the flow tubes 13, 13. Further, due to their rigidity characteristics, the plate springs 16, 16 restrict vibration in a direction other than the driving direction of the drive means 14. The plate springs 16, 16 are members useful in keeping the flow tubes 13, 13 from vibrating in the Y-axis direction or the Z-axis direction.

In the above-mentioned construction, when the fluid is passed through the flow tubes 13, 13, and the drive means 14 is driven to cause the flow tubes 13, 13 to vibrate opposite each other, the mass flow rate is calculated by the above-mentioned signal computing processing portion due to a phase difference generated by the Coriolis force at the positions of the phase difference detectors 15, 15. Further, in this embodiment, the density is also calculated from the vibration frequency. During the driving of the drive means 14, generation of vibration in a direction in which no driving ought to be performed is prevented due to the action of the plate springs 16, 16, so the mass flow rate and the density calculated are output as reliable data.

Figure 4:
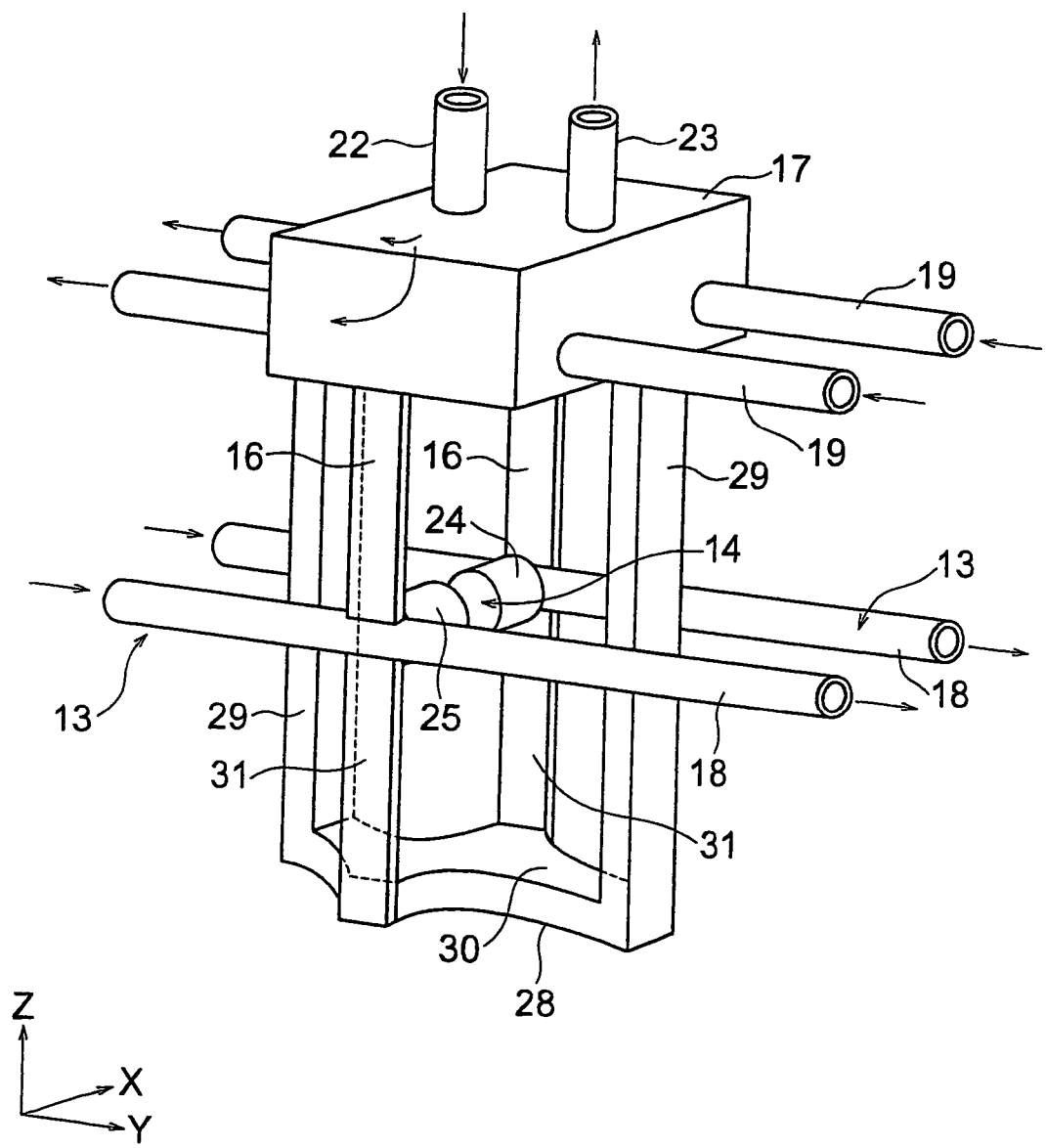
FIG. 4 is a perspective view of another example of a rigid body and an elastic member functioning as the vibrating direction restriction means.

Next, another example of the rigid body and the elastic members functioning as vibrating direction restriction means will be described with reference to FIG. 4. FIG. 4 is a perspective view of another example of the rigid body and the elastic members. The components that are basically the same as those of the above-mentioned form will be indicated by the same reference numerals, and a description thereof will be omitted.

In FIG. 4, a pedestal 28 is provided integrally with the flow tube fixing member 17 functioning as vibrating direction restriction means and serving as a fixing member for the flow tubes 13, 13. Further, the plate springs 16, 16 functioning as vibrating direction restriction means are fixed in position between the flow tube fixing member 17 and the vibration antinodes (driven positions) of the flow tubes 13, 13. The pedestal 28 is a rigid body functioning as vibrating direction restriction means. Here, it is formed in a U-shaped configuration. More specifically, it has leg portions 29, 29 extending in the Z-axis direction between the flow tubes 13, 13, with one end of each of them being continuous with the flow tube fixing member 17, and a connecting portion 30 extending in the Y-axis direction and continuous with the other ends of the leg portions 29, 29.

The leg portions 29, 29 are formed so as to be approximately twice as long as the plate springs 16, 16. The connecting portion 30 has at the centers of the side portions thereof a pair of protruding portions protruding in the X-axis direction. Plate springs 31, 31 are fixed in position between the pair of protruding portions and the vibration antinodes (driven positions) of the flow tubes 13, 13. The plate springs 31, 31 are elastic members functioning as vibrating direction restriction means, and are formed and fixed in position in the same manner as the plate springs 16, 16.

In the above-mentioned construction, when the flow tubes 13, 13 are driven by the drive means 14, the flow tubes 13, 13 vibrate while restricted in their vibration in a direction other than the driving direction (X-axis direction) due to the rigidity of the plate springs 16, 16 and the plate springs 31, 31. Thus, it is possible to prevent the generation of vibrations in a direction in which no driving ought to be performed.

Figure 5:
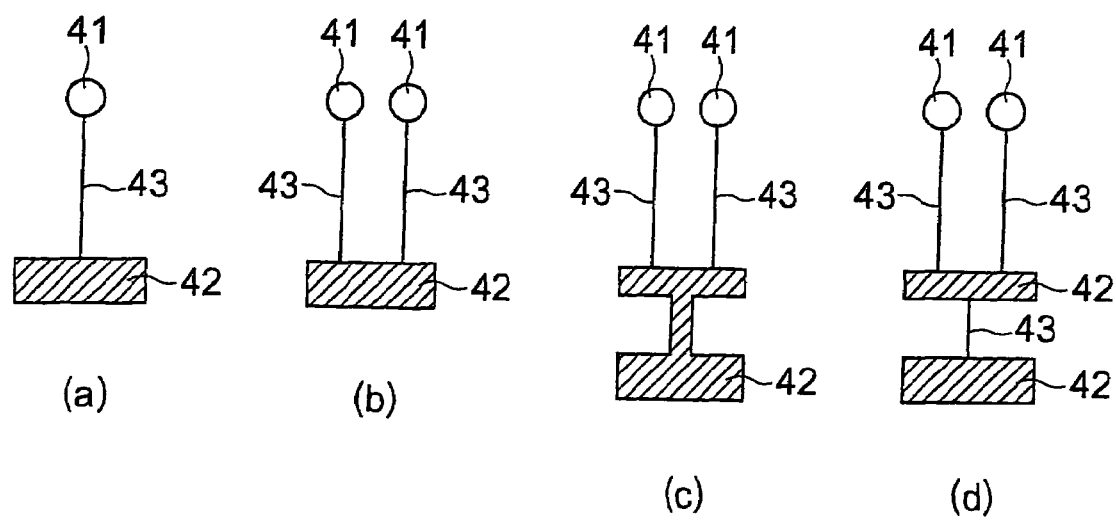
FIG. 5 are schematic views each showing still another example of the rigid body and the elastic member functioning as the vibrating direction restriction means.
Figure 5:
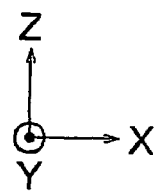
Figure 6:
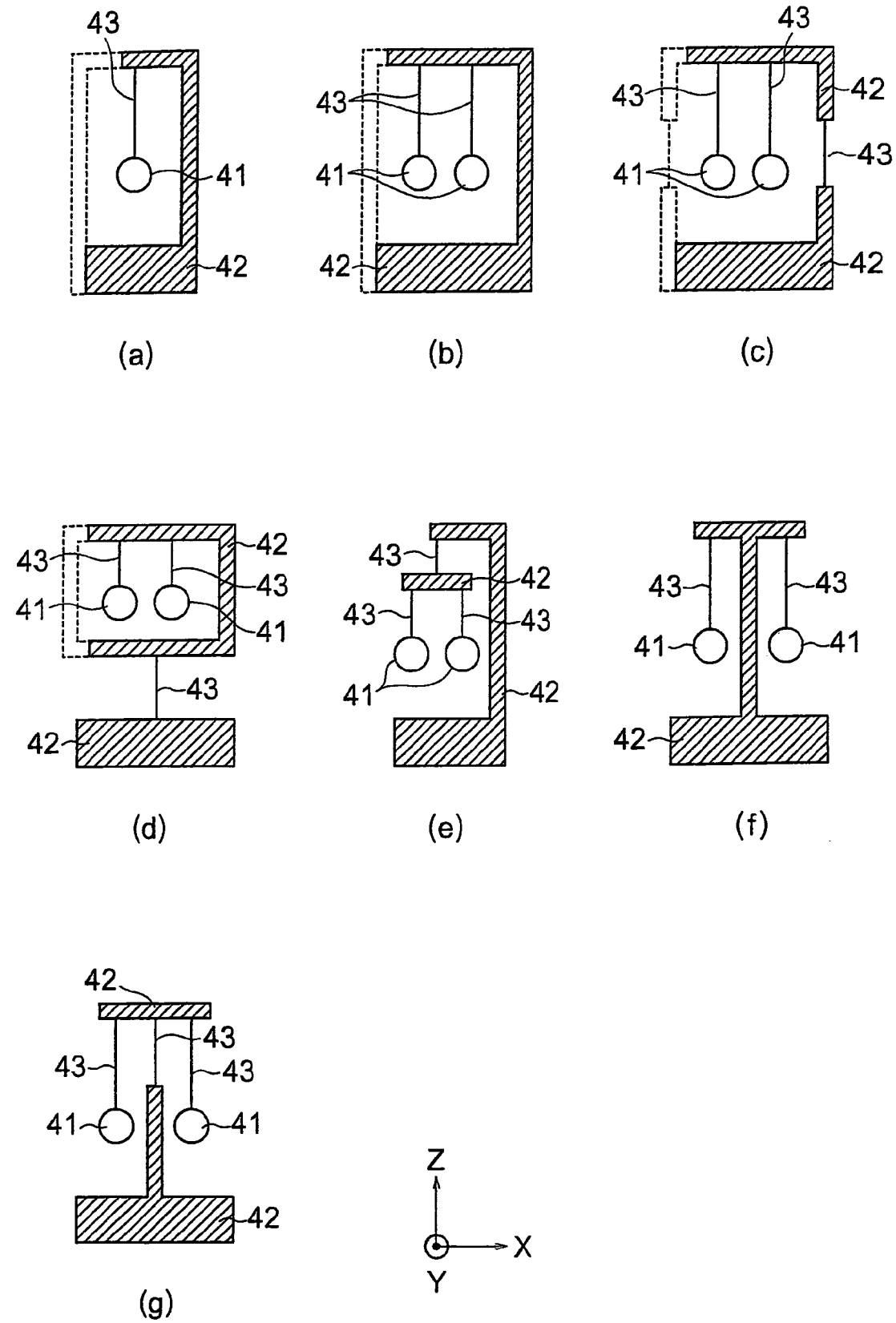
FIG. 6 are schematic views each showing yet another example of the rigid body and the elastic member functioning as the vibrating direction restriction means.
Figure 7:
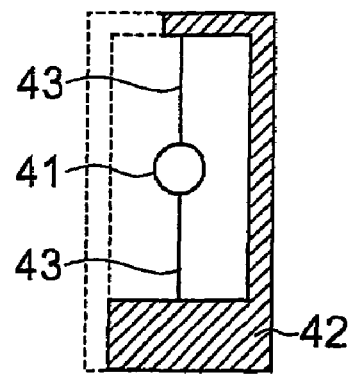
FIG. 7 are schematic views each showing yet another example of the rigid body and the elastic member functioning as the vibrating direction restriction means.
Figure 7:
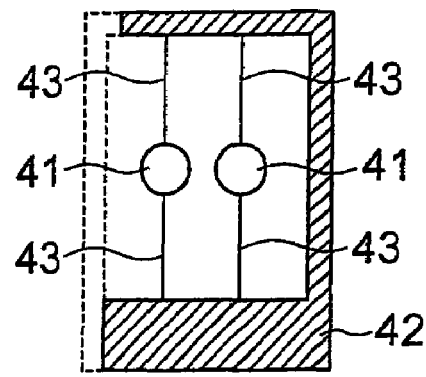
Figure 7:
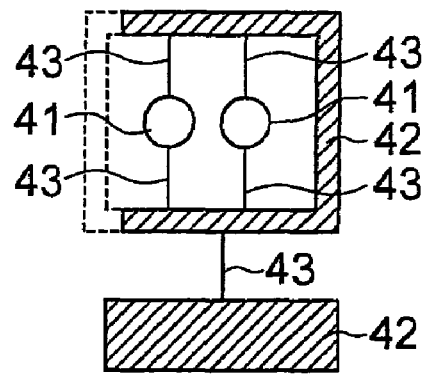
Figure 7:
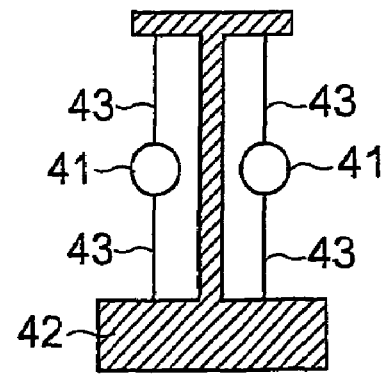
Figure 7:
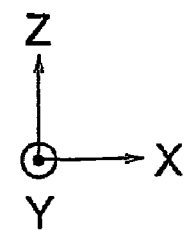
Figure 8:
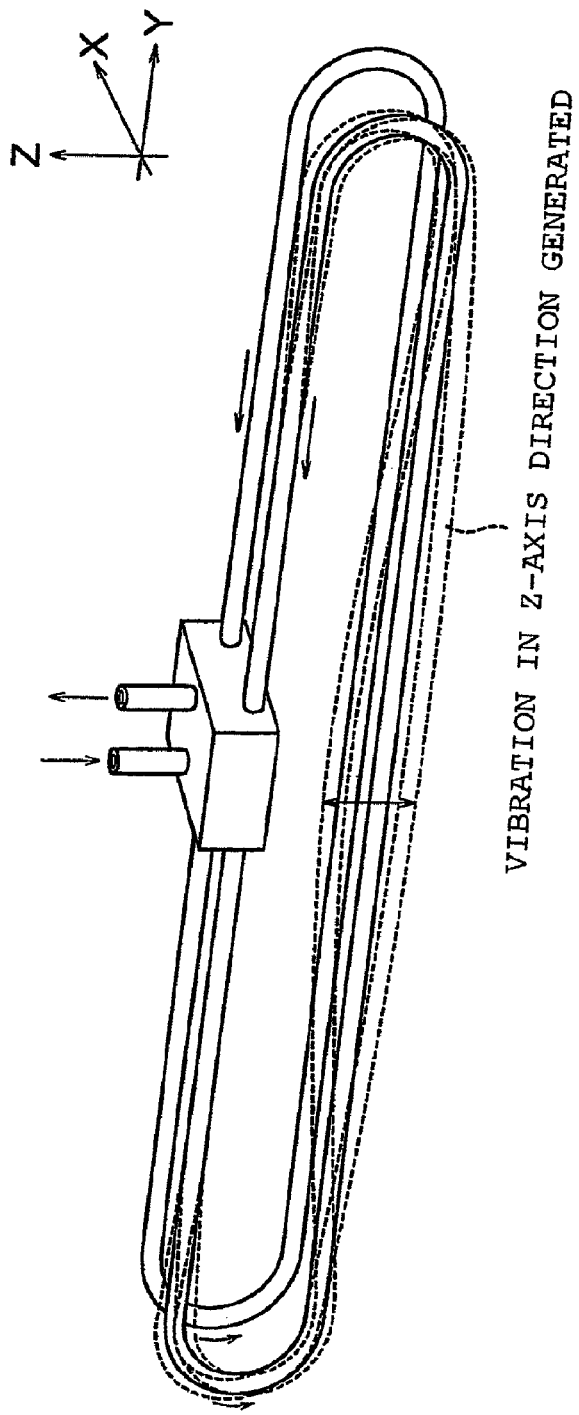
FIG. 8 is a perspective view of conventional flow tubes of an elliptical configuration.

FIGS. 5 through 7 show other examples of the rigid body and the elastic members functioning as vibrating direction restriction means. In the drawings, reference numeral 41 indicates the flow tube. Reference numeral 42 indicates the rigid body. Reference numeral 43 indicates the elastic member. The dashed lines in the drawings indicate the possibility of provision of the rigid body and elastic members at the position concerned. Application of the vibrating direction restriction means as shown in FIGS. 5 through 7 also helps to attain the same effects as described above.

Apart from the above, the present invention naturally allows various modifications without departing from the gist of the invention.

The invention claimed is:

1. A Coriolis flow meter for detecting a phase difference and/or a vibration frequency proportional to a Coriolis force to thereby obtain a mass flow rate and/or a density of a fluid, the Coriolis flow meter comprising:

two flow tubes having end portions, each of the two flow tubes having a tube axis extending in a direction defining a Y-axis direction, the two flow tubes being arranged aligned with each other with a predetermined distance therebetween;

a flow tube fixing member fixing the end portions of the two flow tubes;

a drive portion comprising a coil and a magnet, the drive portion being attached to the two flow tubes at a vibration antinode position for vibrating the two flow tubes in a direction defining an X-axis direction;

a phase difference detection portion configured to detect vibrations of the two flow tubes, and configured to detect a phase difference proportional to a Coriolis force, the phase difference detection portion being at a position of the two flow tubes different from the position of the drive portion; and a plate spring having a first end fixed at, or in a vicinity of, the vibration antinode position of a first flow tube of the two flow tubes, and a second end fixed to the flow tube fixing member, the plate spring configured to restrict a direction of vibration of the first flow tube, wherein the plate spring is substantially planar and substantially X-shaped, and fixed to two portions of the first flow tube and to two portions of the flow tube fixing member, wherein the plate spring is configured such that a rigidity of the plate spring in the X-axis direction is lower than a rigidity of the plate spring in the Y-axis direction and lower than a rigidity of the plate spring in a Z-axis direction, the Z-axis direction being a direction orthogonal to each of the X-axis direction and the Y-axis direction, and wherein the rigidity of the plate spring is such that the direction of vibration of the first flow tube in a direction other than the X-axis direction is restricted by the rigidity of the plate spring in the Y-axis direction and the rigidity of the plate spring in the Z-axis direction.

2. The Coriolis flow meter according to claim 1,
wherein each of the two flow tubes is formed in a substantially elliptical shape with a length of each of the two flow tubes in the Y-axis direction being larger than a length of each of the two flow tubes in the Z-axis direction.

3. The Coriolis flow meter according to claim 1,
wherein the plate spring is constituted by a single elastic body.

4. The Coriolis flow meter according to claim 3,
wherein the phase difference detection portion comprises a coil and a magnet.

5. The Coriolis flow meter according to claim 1,
wherein the plate spring constitutes a first plate spring, further comprising:
a second plate spring having a first end fixed at, or in a vicinity of, the vibration antinode position of a second flow tube of the two flow tubes and a second end fixed to the flow tube fixing member, the second plate spring being configured to restrict a direction of vibration of the second flow tube,
wherein the second plate spring is substantially planar and substantially X-shaped, and fixed to two portions of the second flow tube and to two portions of the flow tube fixing member,
wherein the second plate spring is configured such that a rigidity of the second plate spring in the X-axis direction is lower than a rigidity of the second plate spring in the Y-axis direction and lower than a rigidity of the second plate spring in a Z-axis direction, the Z-axis direction being a direction orthogonal to each of the X-axis direction and the Y-axis direction, and
wherein the rigidity of the second plate spring is such that the direction of vibration of the second flow tube in a direction other than the X-axis direction is restricted by the rigidity of the second plate spring in the Y-axis direction and the rigidity of the second plate spring in the Z-axis direction.

6. The Coriolis flow meter according to claim 5,
wherein each of the two flow tubes is formed in a substantially elliptical shape with a length of each of the two flow tubes in the Y-axis direction being larger than a length of each of the two flow tubes in the Z-axis direction.

7. The Coriolis flow meter according to claim 5,
wherein the first plate spring is constituted by a single elastic body, and
wherein the second plate spring is constituted by a single elastic body.

8. A Coriolis flow meter for detecting a phase difference and/or a vibration frequency proportional to a Coriolis force to thereby obtain a mass flow rate and/or a density of a fluid, the Coriolis flow meter comprising:
two flow tubes having end portions, each of the two flow tubes having a tube axis extending in a direction defining a Y-axis direction, the two flow tubes being arranged aligned with each other with a predetermined distance therebetween;
a flow tube fixing member fixing the end portions of the two flow tubes;
a drive portion comprising a coil and a magnet, the drive portion being attached to the two flow tubes at a vibration antinode position for vibrating the two flow tubes in a direction defining an X-axis direction;
a phase difference detection portion configured to detect vibrations of the two flow tubes, and configured to detect a phase difference proportional to a Coriolis force, the phase difference detection portion being at a position of the two flow tubes different from the position of the drive portion;
a leg portion extending from the flow tube fixing member in a Z-axis direction, the Z-axis direction being a direction orthogonal to the X-axis direction and the Y-axis direction, the leg portion not contacting the two flow tubes, and the leg portion being provided at a distal end thereof with a pedestal having a high rigidity;
a first plate spring having an end fixed to a first flow tube of the two flow tubes in a vicinity of the vibration antinode position and another end fixed to the flow tube fixing member, the first plate spring being configured to restrict a direction of vibration of the first flow tube; and
a second plate spring having an end fixed to a second flow tube of the two flow tubes in a vicinity of the vibration antinode position and another end fixed to the flow tube fixing member, the second plate spring being configured to restrict a direction of vibration of the second flow tube,
wherein the first plate spring has a rigidity in the X-axis direction which is lower than a rigidity of the first plate spring in the Y-axis direction and lower than a rigidity of the first plate spring in the Z-axis direction, and the rigidity of the first plate spring is such that the direction of vibration of the first flow tube in a direction other than the X-axis direction is restricted by the rigidity of the first plate spring in the Y-axis direction and the rigidity of the first plate spring in the Z-axis direction, and wherein the second plate spring has a rigidity in the X-axis direction which is lower than a rigidity of the second plate spring in the Y-axis direction and lower than a rigidity of the second plate spring in the Z-axis direction, and the rigidity of the second plate spring is such that the direction of vibration of the second flow tube in a direction other than the X-axis direction is restricted by the rigidity of the second plate spring in the Y-axis direction and the rigidity of the second plate spring in the Z-axis direction.

9. The Coriolis flow meter according to claim 8,
wherein each of the two flow tubes is formed in a substantially elliptical shape with a length of each of the two flow tubes in the Y-axis direction being larger than a length of each of the two flow tubes in the Z-axis direction.

10. The Coriolis flow meter according to claim 9,
wherein the phase difference detection portion comprises a coil and a magnet.

\* \* \* \* \*